No. 812,038. PATENTED FEB. 6, 1906.
J. HESSBERGER.
REGULATION OF ELECTRIC CURRENTS WHICH FEED ELECTRIC ARCS.
APPLICATION FILED NOV. 22, 1904.

WITNESSES:
William Miller
Edward Wiesner

INVENTOR
Johannes Hessberger
BY
W. C. Hauff
ATTORNEY

UNITED STATES PATENT OFFICE.

JOHANNES HESSBERGER, OF LUDWIGSHAFEN-ON-THE-RHINE, GERMANY, ASSIGNOR TO BADISCHE ANILIN & SODA FABRIK, OF LUDWIGSHAFEN-ON-THE-RHINE, GERMANY, A CORPORATION.

REGULATION OF ELECTRIC CURRENTS WHICH FEED ELECTRIC ARCS.

No. 812,038.  Specification of Letters Patent.  Patented Feb. 6, 1906.

Application filed November 22, 1904. Serial No. 233,860.

*To all whom it may concern:*

Be it known that I, JOHANNES HESSBERGER, electrician, a subject of the King of Prussia, German Emperor, residing at Ludwigshafen-on-the-Rhine, in the Kingdom of Bavaria, German Empire, have invented new and useful Improvements in the Regulation of Electric Currents Which Feed Electric Arcs, of which the following is a specification.

My invention relates to the regulation of electric currents for feeding arcs used in the production of compounds of nitrogen and oxygen.

When either an alternating electric current or a pulsating direct electric current is used to feed an electric arc, it is necessary to insert a large inductive resistance in the circuit, because the resistance of the arc itself is small and continually varies in intensity, and a choking-coil has hitherto been used for this purpose. Although the insertion of the said choking-coil in the circuit prevents undesirably large currents passing through the arc, it causes a large displacement of phase, and consequently the power factor of the circuit is very greatly reduced and the efficiency is very small compared to the amount of plant requisite. An alternating electric current and a pulsating direct electric current are regarded as equivalents and are hereinafter referred to as an alternating electric current.

I have discovered that the power factor of the circuit can be considerably increased if instead of the aforesaid choking-coil a transformer be employed and the current from the secondary coil thereof be used to feed another arc. In this way I obtain economically arcs which are admirably suited for bringing about combinations of the nitrogen and oxygen of the air to form compounds.

The mode of carrying out my invention can be varied, and I illustrate it by reference to the two accompanying figures, in which—

Figure 1:
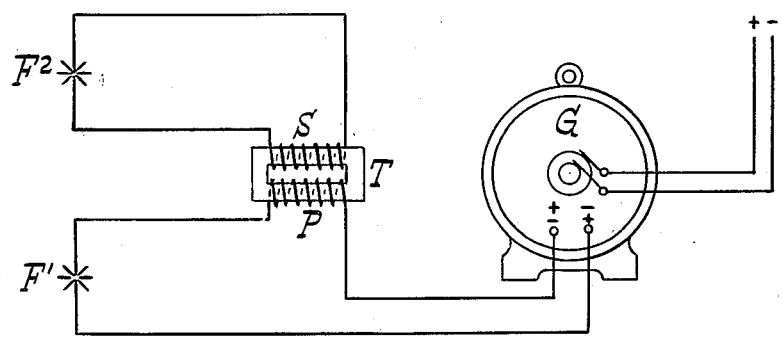
Figure 2:
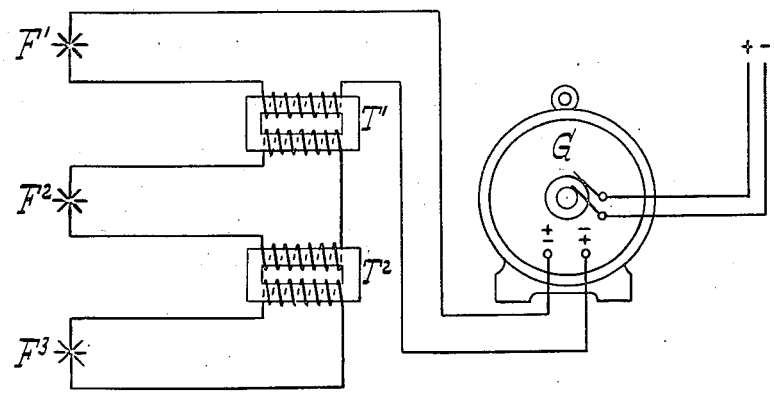

Figure 1 is a diagrammatic view illustrating an embodiment of my invention in which a single transformer is incorporated in the circuit and two arcs are produced, and Fig. 2 is a similar view illustrating an embodiment of my invention in which two transformers are utilized and three arcs produced.

For instance, referring to Fig. 1, the high-tension current from the alternating-current generator G may feed an electric arc F' and also pass through the primary coil P of the transformer T, the current from the secondary coil S of this transformer being used to feed a second electric arc $F^2$. As the current in the circuit containing the first electric arc attains, owing to the presence of this arc, a periodicity which is twice as great as the periodicity of the current given out by the generator and which would obtain in the circuit if the arc were not inserted, (see Steinmetz, *Theory and Calculation of Alternating Currents*, New York, third edition, 1900, pages 393-4,) it is possible on account of the large self-induction created in the secondary coil of the transformer to work the second electric arc without it being necessary to insert a choking-coil into its circuit. If the transformer were not employed, the power factor would be about 0.56, whereas by inserting this second electric-arc circuit the power factor is increased to about 0.7, or, in other words, the displacement of phase is reduced from about sixty degrees (60°) to about forty-five degrees, (45°.)

A modification of the aforesaid mode of carrying out my invention is shown diagrammatically in Fig. 2 and consists in passing the current which comes from the secondary coil of the transformer T' and which feeds the second electric arc $F^2$ through the primary coil of a second transformer $T^2$ and using the current from the secondary coil of this second transformer to feed a third electric arc $F^3$. By this arrangement also the displacement of phase is brought down to a very favorable value, and the total energy given out by the generator is used up in the arcs. Similarly, a third transformer or more can be employed.

Now what I claim is—

The process of supplying currents to a plurality of circuits containing arcs suitable for the production of compounds of nitrogen and oxygen with the minimum displacement of phase, which consists in generating an alternating current, supplying therewith the primary of a transformer and an arc, and feeding a different arc with the secondary current from the transformer.

In testimony whereof I have hereunto set my hand in the presence of two subscribing witnesses.

JOHANNES HESSBERGER.

Witnesses:
J. ALEC. LLOYD,
JOS. H. LEUTE.